United States Patent
Cheong

(10) Patent No.: US 7,542,528 B1
(45) Date of Patent: Jun. 2, 2009

(54) FAR END CROSSTALK MITIGATION IN MULTIPLE-INPUT MULTIPLE-OUTPUT (MIMO) CHANNELS USING PARTIAL MAXIMUM LIKELIHOOD MIMO-DFE

(75) Inventor: Kok-Wui Cheong, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 805 days.

(21) Appl. No.: 10/978,128

(22) Filed: Oct. 29, 2004

Related U.S. Application Data

(60) Provisional application No. 60/600,515, filed on Aug. 10, 2004.

(51) Int. Cl.
*H04L 27/38* (2006.01)
(52) U.S. Cl. .................... 375/341; 375/233; 375/260
(58) Field of Classification Search ......... 375/340–341, 375/262
See application file for complete search history.

(56) References Cited

U.S. PATENT DOCUMENTS

| | | | | |
|---|---|---|---|---|
| 2002/0154704 | A1* | 10/2002 | Reshef | 375/262 |
| 2003/0035491 | A1* | 2/2003 | Walton et al. | 375/267 |
| 2004/0120274 | A1* | 6/2004 | Petre et al. | 370/320 |
| 2005/0174926 | A1* | 8/2005 | Barrass | 370/201 |
| 2006/0047842 | A1* | 3/2006 | McElwain | 709/231 |
| 2006/0133519 | A1* | 6/2006 | Tsatsanis et al. | 375/260 |

OTHER PUBLICATIONS

Nikolic, Borivoje et al., High-Speed Electrical Interfaces, Mar. 7, 2004 (date from wayback machine, web.archive.org), Course Lecture notes from Spring 2004, p. 15, silde 29. PDF available at: http://web.archive.org/web/20060913205802/bwrc.eecs.berkeley.edu/classes/ee290c_s04/lectures/Lecture1-Intro.pdf.*
Naofal Al-Dhahir and Ali H. Sayed, "The Finite-Length Multi-Input Multi-Output MMSE-DFE", IEEE Transactions On Signal Processing, vol. 48, No. 10, Oct. 2000, pp. 2921-2936.

* cited by examiner

*Primary Examiner*—Shuwang Liu
*Assistant Examiner*—David Huang

(57) ABSTRACT

A partial maximum likelihood (ML) far end crosstalk (FEXT) decoder for a multiple-input multiple-output (MIMO) communications channel comprises an initial estimate generator module that generates initial decisions for X channels based on filtered outputs of received signals and feedback from prior decisions. A constellation point selector selects P constellation points for the X channels from a constellation including N points based on the initial decisions. A current estimate generator module evaluates each of the selected P constellation points for each of the X channels as feedback signals and generates final decisions based on selected ones of the constellation points for each of the X channels.

88 Claims, 5 Drawing Sheets

FAR END CROSSTALK MITIGATION IN MULTIPLE-INPUT MULTIPLE-OUTPUT (MIMO) CHANNELS USING PARTIAL MAXIMUM LIKELIHOOD MIMO-DFE

CROSS-REFERENCE TO RELATED APPLICATIONS

This application claims the benefit of U.S. Provisional Application No. 60/600,515, filed on Aug. 10, 2004. The disclosure of the above application is incorporated herein by reference.

FIELD OF THE INVENTION

The present invention relates to communications channels, and more particularly to multiple-input-multiple-output channels with decision feedback equalization (DFE).

BACKGROUND OF THE INVENTION

As data transmission rates in multiple-input-multiple-output (MIMO) systems increase, bandwidth and constellation sizes of these systems also typically increase. As bandwidth increases, noise has a larger impact on the performance of these systems. Near end crosstalk (NEXT) and far end crosstalk (FEXT) are two types of noise in MIMO systems. NEXT is crosstalk coupling between a local receiver of one channel and local transmitters of the other channels. FEXT is crosstalk coupling between a local receiver of one channel and remote transmitters of the other channels.

In the next generation 10GBASE-T standard, channel bandwidth will be in the range of 400-500 MHz as compared to 62.5 MHz in 1000BASE-T. Since FEXT coupling increases with frequency, FEXT noise will become more significant at this higher operating frequency and should be mitigated to ensure reliable data transmission.

FEXT noise arises from the coupling of other transmission lines into the main line. The signal from the main channel is usually much stronger than the signal from FEXT. The model for FEXT as given by ISO 11801 channel specification is:

| Pair-to-pair ELFEXT: |  |
| --- | --- |
| CAT 5e | $-20\log_{10}(10^{(63.8-20\log 10 f)/-20} + 4 \cdot 10^{(75.1-20\log 10 f)/-20})$, $1 \leq f \leq 100$ |
| CAT 6 | $-20\log_{10}(10^{(67.8-20\log 10 f)/-20} + 4 \cdot 10^{(83.1-20\log 10 f)/-20})$, $1 \leq f \leq 250$ |

| Power-Sum ELFEXT: |  |
| --- | --- |
| CAT 5e | $-20\log_{10}(10^{(60.8-20\log 10 f)/-20} + 4 \cdot 10^{(72.1-20\log 10 f)/-20})$, $1 \leq f \leq 100$ |
| CAT 6 | $-20\log_{10}(10^{(64.8-20\log 10 f)/-20} + 4 \cdot 10^{(80.1-20\log 10 f)/-20})$, $1 \leq f \leq 250$ |

The models can be extended to the frequencies above those specified in the standard specifications. The models show that the FEXT coupling increases as the frequencies increases.

Referring now to FIG. 1, first and second exemplary network devices 10 and 12, respectively, communicate over a data communications medium with four full-duplex channels 14-A, 14-B, 14-C, and 14-D. For example, the first and second network devices 10 and 12, respectively, may be Gigabit or 10G Ethernet network devices. Each of the channels 14 at the first and second network devices 10 and 12, respectively, are identified as A, B, C, or D and include a transceiver 16 and a hybrid 18. The transceivers 16 include transmitters 20 and receivers 24, which process transmitted and received data, respectively. The hybrids 18 facilitate full-duplex communications over the data communications medium.

FEXT occurs at a local receiver due to signals transmitted by remote transmitters associated with other channels. FEXT is schematically shown at 26, 28 and 30. FEXT 26 is crosstalk coupling between signals generated by the transmitter of transceiver 16-B2 and signals received at the receiver 24-A1 of transceiver 16-A1. FEXT 28 is crosstalk coupling between signals generated by the transmitter of transceiver 18-B2 and signals received at the receiver 24-A1 of transceiver 16-A1. FEXT 30 is crosstalk coupling between signals generated by the transmitter of transceiver 18-C2 and signals received at the receiver 24-A1 of transceiver 16-A1. Similar FEXT occurs in Channels B, C and D.

SUMMARY OF THE INVENTION

A partial maximum likelihood (ML) far end crosstalk (FEXT) decoder for a multiple-input multiple-output (MIMO) communications channel according to some embodiments comprises an initial estimate generator module that generates initial decisions for X channels based on filtered outputs of received signals and feedback from prior decisions. A constellation point selector selects P constellation points for the X channels from a constellation including N points based on the initial decisions. A current estimate generator module evaluates each of the selected P constellation points for each of the X channels as feedback signals and generates final decisions based on selected ones of the constellation points for each of the X channels.

In other features of some of the implementations, the initial estimate generator module generates the initial decisions based on:

$$\bar{X}_0 = (1-\alpha B_0)^{-1}\alpha(W^*Y + B_p \hat{X}_p),$$

where $\alpha$ is the scaling factor to achieve an unbiased decision estimate, $B_0$ is a feedback matrix using current decisions, $Y$ is the received signal, $W^*$ is a feedforward matrix, $B_p$ is a feedback matrix using previous decisions, and $\hat{X}_p$ are the previous decisions. $B_0 = \epsilon_0 - R_{11}\mathrm{diag}(R_{11})^{-1}$ where $\epsilon_0$ is a matrix with a first block that is an identity matrix and remaining blocks are zero and wherein $R_{11}$ is the first 4×4 submatrix of $R = I - H_c^*(H_c H_c^* - HH^* - \sigma^2/E_x I)^{-1} H_c$.

The constellation point selector module selects the P constellation points that are closest to the initial decisions. The current estimate generator module selects the constellation points for the X channels based on means squared error (MSE) calculations. A min max of the MSE calculations is selected.

A system comprises the decoder and further comprises an analog front end that communicates with the decoder.

A network device comprises the decoder. The network device is compliant with 10GBASE-T.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
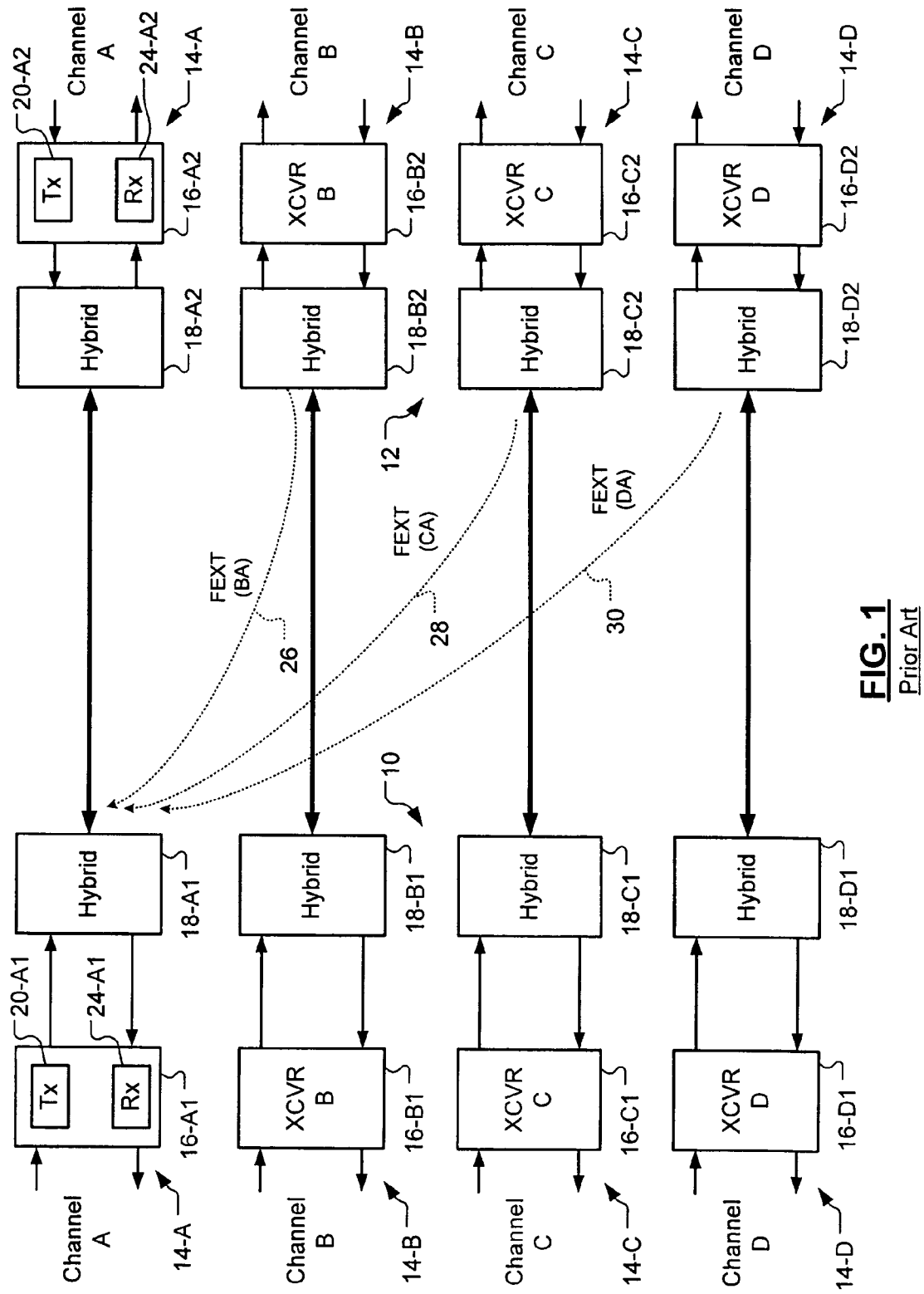
FIG. 1 is a functional block diagram of network devices and an illustration of FEXT that occurs therebetween.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
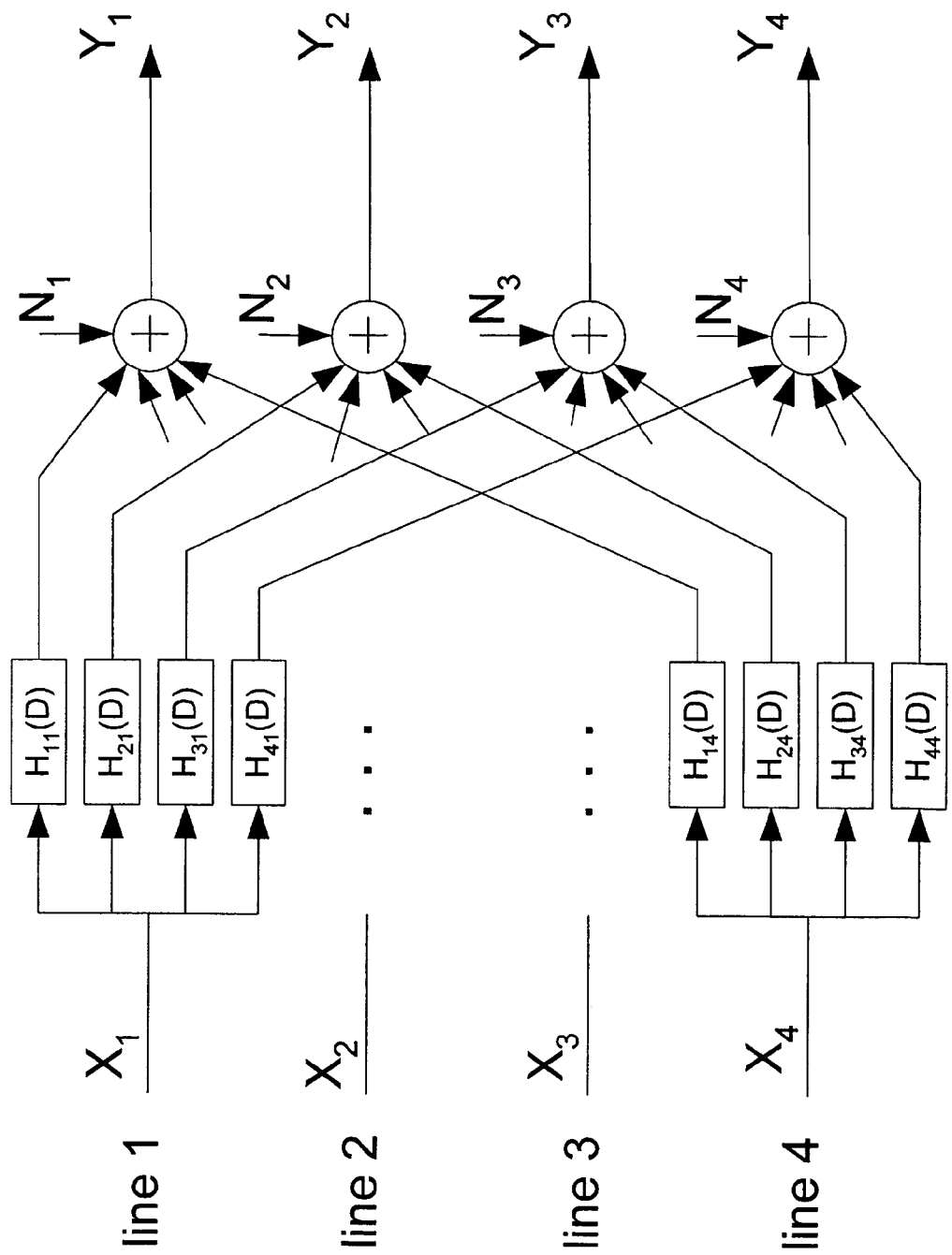
FIG. 2 is a functional block diagram of a multiple-input-multiple output (MIMO) channel model.

Referring now to FIG. 2, for a cable with four pairs of wires, there are four inputs at the transmitter and four outputs at the receiver. The MIMO Channel model can be written as:

$$\begin{bmatrix} Y_1(D) \\ Y_2(D) \\ Y_3(D) \\ Y_4(D) \end{bmatrix} = \begin{bmatrix} H_{11}(D) & H_{12}(D) & H_{13}(D) & H_{14}(D) \\ H_{21}(D) & H_{22}(D) & H_{23}(D) & H_{24}(D) \\ H_{31}(D) & H_{32}(D) & H_{33}(D) & H_{34}(D) \\ H_{41}(D) & H_{42}(D) & H_{43}(D) & H_{44}(D) \end{bmatrix} \cdot \begin{bmatrix} X_1(D) \\ X_2(D) \\ X_3(D) \\ X_4(D) \end{bmatrix} + \begin{bmatrix} N_1(D) \\ N_2(D) \\ N_3(D) \\ N_4(D) \end{bmatrix},$$

or equivalently as:

$$Y(D)=H(D)X(D)+N(D),$$

where H(D) are the channel responses matrix, N(D) are channel noise vector, X(D) are transmitter inputs vector and Y(D) are receiver outputs vector.

Figures 3, 4:
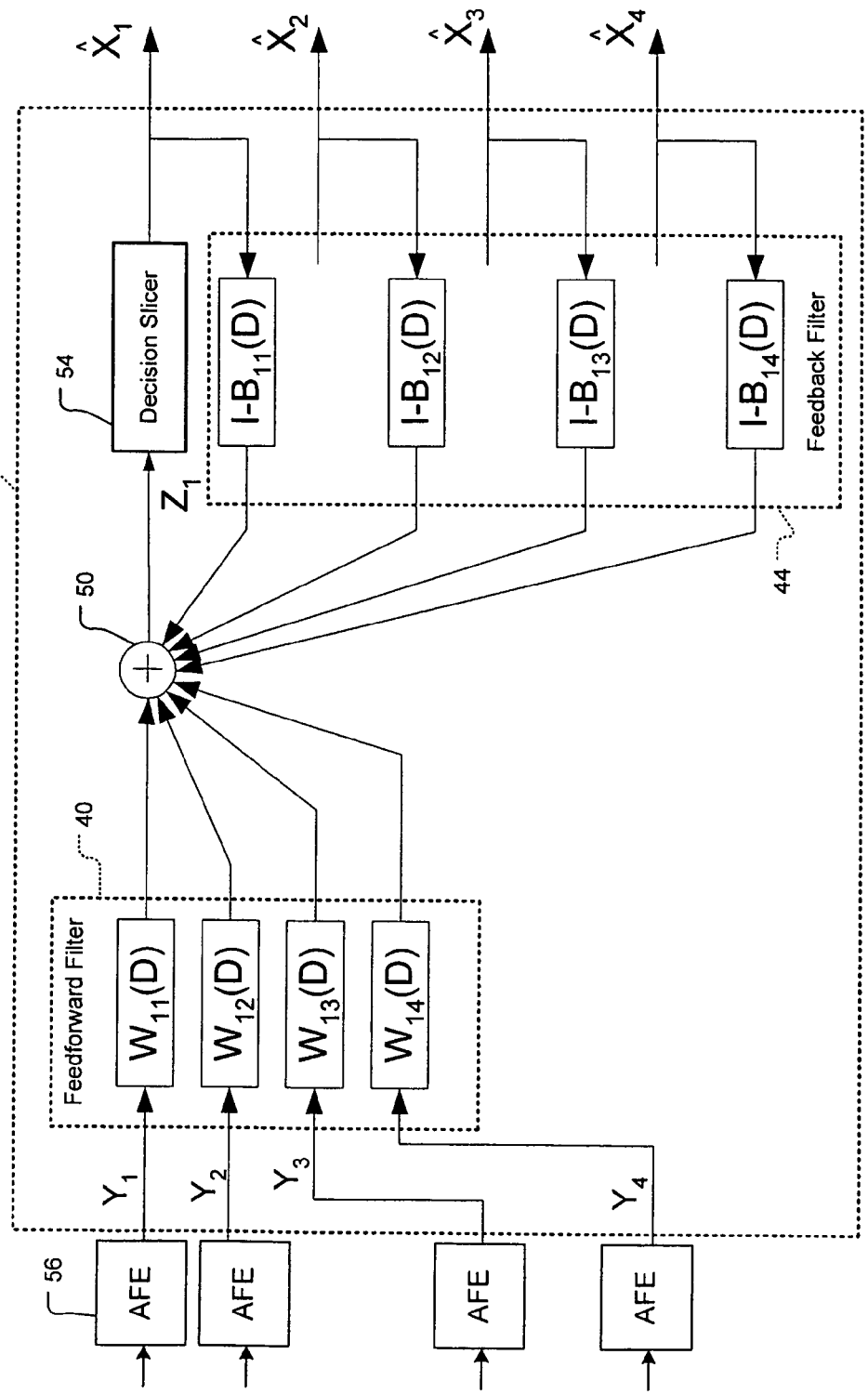
FIG. 3 is a functional block diagram of a MIMO channel with decision feedback equalization (DFE)
FIG. 4 illustrates selection of points for partial maximum likelihood (ML) decision.

Referring now to FIG. 3, a MIMO decision feedback equalizer (DFE) 36 includes a feedforward filter matrix 40 W(D) of size 4×4, a feedback filter matrix 44 B(D) of size 4×4 (where B(D) is a causal filter), a summer 50 and a decision slicer 54. An analog front end 56 performs analog and/or digital filtering and analog to digital conversion. As can be appreciated, the matrices would be X by X where X is the number of channels in the MIMO system.

The input to the decision slicer 54 is $Z(D)=W(D)Y(D)+(1-B(D))X(D)$ and the error sequence is $E(D)=X(D)-Z(D)=B(D)X(D)-W(D)Y(D)$. For the minimum mean squared error (MMSE) solution to this error sequence, the optimal filters are derived from the equation $E[E(D)Y^*(D^{-*})]=0$. Solving this equation leads to:

$$W(D)=B(D)R_{XY}(D)R_{YY}^{-1}(D)=B(D)R_{XX}(D)H^*(D)(H(D)R_{XX}(D)H^*(D)+R_{NN}(D))^{-1}$$

In this case, the correlation matrix of the error sequence is:

$$R_{ee}(D)=B(D)R^{-1}(D)B^*(D^{-*}),$$

where $R(D)=R_{XX}^{-1}(D)+H^*(D^{-*})R^{NN-1}(D)H(D)$.

There are different choices for the feedback matrix filter in the MIMO case depending on whether the current decisions are fed back to the lines that have not made a decision. The following sections discuss the different choices for B(D).

When the feedback is strictly causal, $B_0=I$, where $B(D)=\Sigma_{k\geq 0}B_k D^k$. Since $R^{-1}(D)$ is a positive definite symmetric matrix, it is factorizable in the form:

$$R(D)=L^*(D^{-*})\Lambda L(D),$$

where L(D) is a monic ($L_0=I$), causal ($L_k=0$ for k<0, where $$L(D) = \sum_k L_k D^k)$$

and a minimum phase matrix filter. In this case, the autocorrelation for the error sequence is:

$$R_{ee}(D)=B(D)L^{-1}(D)\Lambda^{-1}L^{-*}(D^{-*})B^*(D^{-*})$$

$R_{ee,0}$ has minimum trace when $B(D)=L(D)$, and the minimum value is $\Lambda^{-1}$.

For the sequential causal feedback approach, when a decision is made for one channel, its decision can be used as a feedback to reduce the FEXT caused by this channel with respect to the other channels that are not decoded yet. In this case, a row permuted $B_0$ is a lower triangular matrix. The channels are assumed to be decoded in the given order, so that $B_0$ is a lower triangular matrix.

When the feedback is causal, prior decisions from the channel are fed back, as well as current and prior decisions from other channels. This can be done, for example, in an iterative decoder. The decisions made in an iterative step are used for the decision in the next iterative step.

For the finite length MMSE-DFE, the factorization required can be done by matrix operations. In the following section, the results for the three cases are given for the finite length MIMO-DFE assuming a MIMO-DFE with $N_f$ feedforward taps and $N_b$ feedback taps and the decision delay is A.

The channel model is given by:

$$\begin{bmatrix} \overline{Y}_k \\ \overline{X}_k \end{bmatrix} = \begin{bmatrix} H \\ \tilde{I} \end{bmatrix} [\tilde{X}_k] + \begin{bmatrix} N_k \\ 0 \end{bmatrix}$$

where $\overline{Y}_k=[Y_k \ldots Y_{k-N_f+1}]^T$, $\overline{X}_k=[X_{k-\Delta} \ldots X_{k-\Delta-N_b+1}]^T$, and $\tilde{I}=[0\ I\ 0]$ with I at the $\Delta^{th}$ position. The decision of the MIMO-MMSE-DFE is:

$$\hat{X}_{k-\Delta} = [W^* B^*]\begin{bmatrix} \overline{Y}_k \\ \overline{X}_k \end{bmatrix},$$

where $W^*=[W_0^* \ldots W_{N_f-1}^*]$, and $B^*=[B_0^* \ldots B_{N_b-1}^*]$. The error vector is:

$$e_{k-\Delta}=x_{k-\Delta}-\hat{x}_{k-\Delta}=(\epsilon_0-B)^*\overline{X}_k-W_k^*\overline{Y}_k,$$

where $\epsilon_0$ is a matrix with the first block being the identity matrix and the rest of the matrix is zero. For a MMSE solution to the problem, for a given B, the MMSE solution for W is given by:

$$W_k^*=(\epsilon_0-B)^*R_{\overline{XY}}R_{\overline{YY}}^{-1}.$$

In this case, the auto-correlation of the error vector is given by:

$$R_{ee} = E(e_{k-\Delta}e_{k-\Delta}^*) = (\varepsilon_0 - B) * [R_{\overline{XX}} - R_{\overline{XY}}R_{\overline{YY}}^{-1}R_{\overline{YX}}](\varepsilon_0 - B),$$

where $R_{\overline{XX}}$, $R_{\overline{XY}}$, and $R_{\overline{YY}}$ are the correlation matrices of $\overline{X}$ and $\overline{X}$, $\overline{X}$ and $\overline{Y}$, and $\overline{Y}$ and $\overline{Y}$, respectively. The equation can be simplified to the expression $R_{ee}=E_x(\epsilon_0-B)^*R^{-1}(\epsilon_0-B)$, where $R=I-H_c^*(H_cH_c^*-HH^*-\sigma^2/E_x I)^{-1}H_c$. $H_c$ is a submatrix of H consisting of the columns from $\Delta+1^{th}$ column to the $\Delta+N_b^{th}$ column. In order to minimize the trace of $R_{ee}$ so as to maximize the SNR subject to the condition that $(\epsilon_0-B)^*\epsilon_0=C_0$, the optimal B is given by $B_{opt}=\epsilon_0-R\epsilon_0(\epsilon_0^*R\epsilon_0)^{-1}C_0$, and the error vector autocorrelation is $R_{ee,min}=C_0^*(\epsilon_0^*R\epsilon_0)^{-1}C_0$. The choice of $C_0$ gives the different MIMO-MMSE-DFE as explained in the following sections.

For a strictly causal MIMO-MMSE-DFE, $C_0$ is set equal to I so that there is no feedback of the current decisions. In this case, $B=-H_c^*A^{-1}H_\Delta$ and $W=A^{-1}H_\Delta$, where $H_{c'}$ is a submatrix of H consisting of the $\Delta+2^{th}$ to the $\Delta+N_b^{th}$ columns, $H_\Delta$ is the $\Delta+1^{th}$ column of H, and $A=HH^*-H_{c'}H_{c'}^*+\sigma^2/E_x I$. The error vector autocorrelation is given by $R_{ee,min,2}=R_{11}^{-1}$, where $R_{11}$ is the first 4×4 submatrix of R.

For sequential causal feedback, decisions that are already made can be fed back to recover data from other channels that have not made their decisions. In this case, the feedback matrix for the current sample, $B_0$, is a lower triangular matrix. The optimal solution to this problem is given by $B_0=L$, where $R_{11}=LDL^*$, L is a lower triangular matrix and D is a diagonal matrix. The optimal feedback and feedforward matrices are $B=\epsilon_0-R\epsilon_0(\epsilon_0^*R\epsilon_0)^{-1}L$, and $W=A^{-1}H_\Delta L$. The error autocorrelation is $R_{ee,min,2}=L^*R_{11}^{-1}L$.

For causal feedback, decisions from other channels can be fed back to aid in recovering data from other channels. In this case, the feedback matrix for the current sample, $B_0$, has zero diagonal elements. The optimal solution to this problem is given by $B_0=\epsilon_0-R_{11}\text{diag}(R_{11})^{-1}$. The optimal feedback and feedforward matrices are $B=\epsilon_0-R\epsilon_0\text{diag}(R_{11})^{-1}$, and $W=A^{-1}H_\Delta R_{11}\text{diag}(R_{11})^{-1}$. The error autocorrelation is $R_{ee,min,3}=\Sigma 1/(\text{diag}(R_{11}))_i$. It can be shown that $\text{tr}(R_{ee,min,1})\geq\text{tr}(R_{ee,min,2})\geq\text{tr}(R_{ee,min,3})$.

Since $\text{tr}(R_{ee,min,1})\geq\text{tr}(R_{ee,min,2})\geq\text{tr}(R_{ee,min,3})$, it is desirable to implement causal feedback MIMO-DFE. One way is to implement an iterative decoder, where the current decisions are iteratively refined by feeding them back to the decoder. However, using iterative decoding is complex and the decoder has to run at a higher speed than a normal decoder. For 10GBASE-T or 1000BASE-T systems, running at a higher speed than a normal decoder might not be possible due to power and size constraints.

Figure 5:
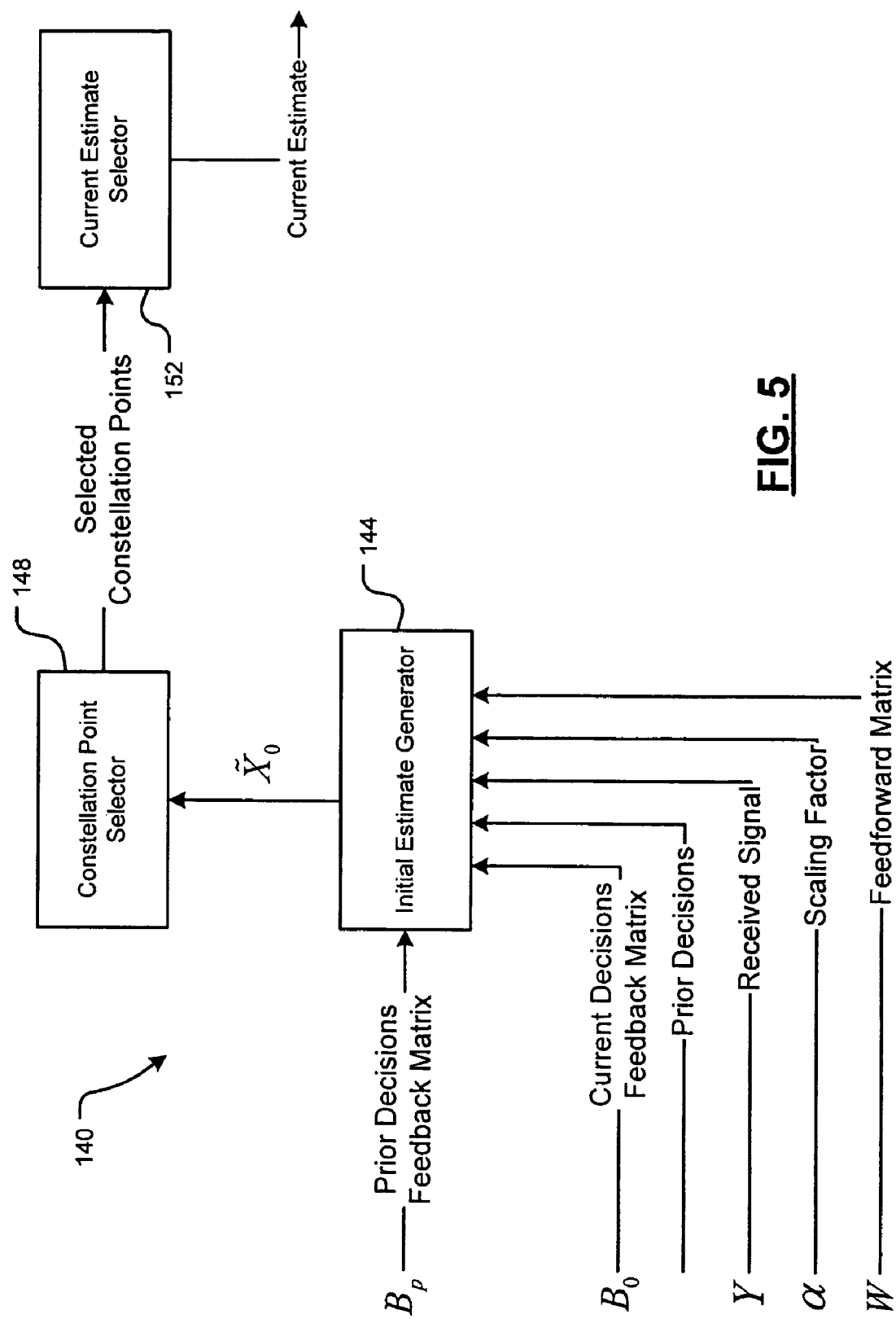
FIG. 5 is an exemplary functional block diagram of a partial maximum likelihood (ML) FEXT decoder module for MIMO channels.

Referring now to FIG. 5, a partial ML decoder module 140 according to the present invention is shown. In order to avoid the complexity of the iterations, tentative decisions in causal feedback of the MIMO MMSE-DFE are made. The tentative decision can be made based on the filtered output of the received signal and the feedback of the previous decisions. The equation needed to do this is given below:

$$\tilde{X}_0=(1-\alpha B_0)^{-1}\alpha(W^*Y+B_p\hat{X}_p),$$

where $\alpha$ is the scaling factor to achieve an unbiased estimate for the decisions, $B_0$ is the feedback matrix using the current decisions, $B_p$ is the feedback matrices using the previous decisions, and $\hat{X}_p$ are the previous decisions.

A partial ML decoder module 140 based on $\tilde{X}_0$ is used according to some embodiments of the present invention. Depending on the complexity, P constellation points around the initial estimate of the signal are selected to be evaluated as feedback signals for the estimate of the current decision. The appropriate point is selected among these selected points as the current estimate according to the criterion chosen. As an example, P=3 closest points around the initial estimate are chosen by the partial ML decoder 140 to estimate the signal. For example, signals falling into the gray region in FIG. 4 choose the three points shown.

Since there are 4 channels in this example, the number of iterations of the partial ML decoder module 140 is $P^4$, where P is the number of test points for each channel. The decoder performs partial ML decoding since the full version of the ML is done with all N points in the constellation, and will be complex if the constellation is large, such as in 1000Base-T and 10GBase-T. For example, N may be equal to 10, which will require $10^4$ calculations using ML decoding for casual feedback. In contrast, when P=3, only $3^4$ calculations are required using partial ML decoding according to the present invention for causal feedback. The partial ML decoder module 140 performs well since it performs maximum likelihood on the points that are more likely than others to be the correct estimates.

Once the possibilities of the estimates are chosen, the partial ML decoder module 140 tries all the different possibilities and computes the decision with this feedback. The chosen estimate should satisfy the following criteria. First, the decision of the partial ML MIMO-DFE is the same as the values used for the feedback. Second, the estimate chosen gives the smallest mean squared error (MSE) of all the estimates that satisfy the first criterion. To reduce the probability of error, the min max of MSE of the 4 different channels may be used in some embodiments as a criterion for the partial ML decoder 140 since noise at the partial ML decoder module 140 for the different channels are similar in variance. The partial ML decoder module 140 can be used in conjunction with feedback taps with limited values to control the amount of error propagation. The added advantage of the partial ML decoder approach is that it ensures the consistency of the estimates since the current decision is also used as a feedback in the decoder.

Referring back to FIG. 5, the partial ML FEXT decoder module 140 includes an initial estimate generator module 144 that generates an initial estimate $\tilde{X}_0$. A constellation point selector module 148 selects P constellation points based on the initial estimate where $1<=P<=N$. A current estimate selector module 152 evaluates the selected P constellation points and selects one as the current estimate.

The initial estimate generator module 144 generates the initial estimate $\tilde{X}_0$ based on the prior decisions feedback matrix $B_p$, the current decisions feedback matrix $B_0$, prior decisions $\hat{X}_p$, the received signals Y, a scaling factor $\alpha$ and the feedforward matrix $W^*$. More specifically, $\tilde{X}_0 = (1-\alpha B_0)^{-1}\alpha(W^*Y + B_p\hat{X}_p)$ The constellation point selector module 148 selects the constellation points around the initial estimate. The number P of selected constellation points will depend upon the particular implementation. The current estimate selector 152 uses the selected P constellation points for each of the X channels as feedback signals for the current estimate. One of the P constellation points is selected based on any suitable criteria. For example, the current estimate selector 152 can be a maximum likelihood selector that uses MSE, min max MSE, or other ML criteria.

Figure 6:
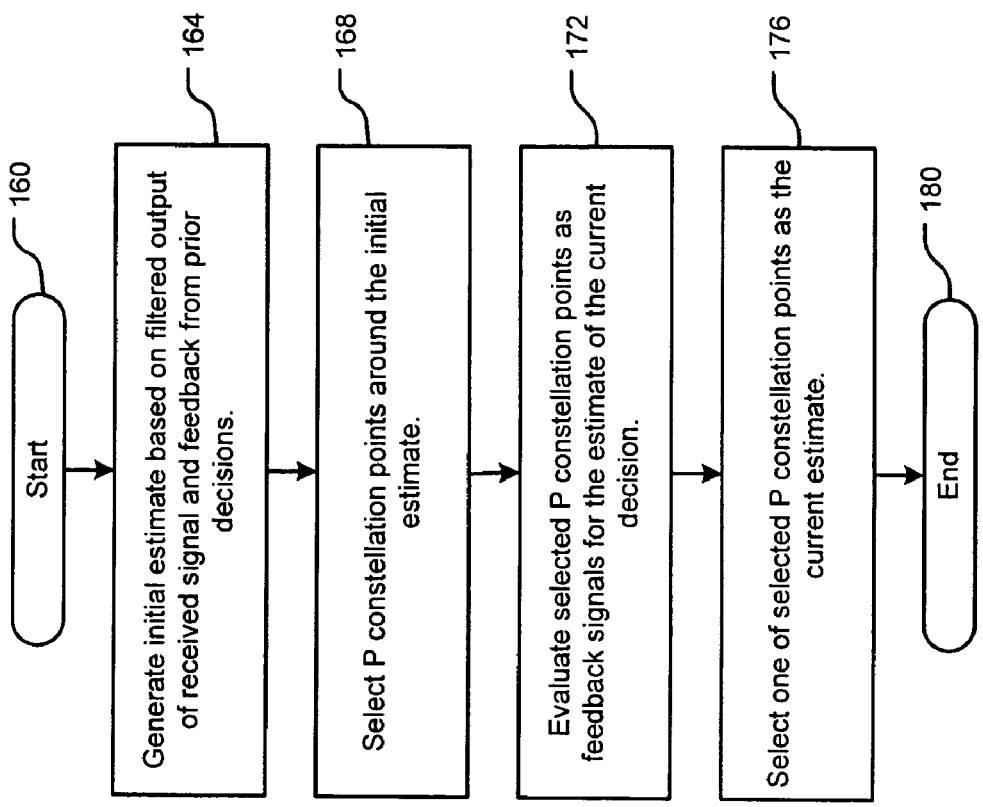
FIG. 6 is a flowchart illustrating exemplary steps that are performed by the partial ML FEXT decoder module of FIG. 6.

Referring now to FIG. 6, steps that are performed by the partial ML FEXT decoder module 140 are shown in further detail. Control begins in step 160. In step 164, the initial estimate $\tilde{X}_0$ is generated based on a filtered output of received signal and feedback from prior decisions as described above. In step 168, P constellation points for each channels are selected around the initial estimate $\tilde{X}_0$. In step 172, the selected P constellation points for each channels are selected as feedback signals for the estimate of the current decision. In step 176, one of the P constellation points for each channel is selected as the current estimate. Control ends in step 180.

Some of the advantages of partial ML MIMO DFE for FEXT mitigation include the use of energy from FEXT signals to aid decoder, improved performance compared to other methods, improved consistency in estimates, error detection when decisions are not consistent, and reduced error propagation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A decoder for a multiple-input multiple-output (MIMO) communications channel, comprising:
   an initial estimate generator module that generates initial decisions for X channels based on filtered outputs of received signals and feedback from prior decisions, wherein X is an integer greater than one;
   a constellation point selector module that selects P constellation points for each of said X channels from a constellation including N points based on said initial decisions, where N is an integer greater than two and P is an integer less than N and greater than one; and
   a current estimate selector module that evaluates $P^X$ permutations, each permutation including one of said selected P constellation points for each of said X channels, as feedback signals and that generates final decisions based on a selected one of said $P^X$ permutations.

2. The decoder of claim 1 wherein said initial estimate generator module generates said initial decisions based on:

$\tilde{X}_0 = (1-\alpha B_0)^{-1}\alpha(W^*Y + B_p\hat{X}_p)$, where $\alpha$ is a scaling factor to achieve an unbiased decision estimate, $B_0$ is a feedback matrix, Y is said received signals, W* is a feedforward matrix, $B_p$ is a feedback matrix, and $\hat{X}_p$ are said prior decisions.

3. The decoder of claim 2 wherein $B_0 = \epsilon_0 - R_{11}\mathrm{diag}(R_{11})^{-1}$, where $\epsilon_0$ is a matrix with a first block that is an identity matrix and remaining blocks are zero and wherein $R_{11}$ is the first X by X submatrix of $R = I - H_c^*(H_cH_c^* - HH^* - \sigma^2/E_x I)^{-1}H_c$.

4. The decoder of claim 1 wherein said constellation point selector module, for each of said X channels, selects said P constellation points that are closest to a corresponding one of said initial decisions.

5. The decoder of claim 1 wherein said current estimate selector module selects said one of said $P^X$ permutations based on mean squared error (MSE) calculations.

6. The decoder of claim 5 wherein an MSE value is determined for each of said $P^X$ permutations and one of said $P^X$ permutations corresponding to a minimum one of said MSE values is selected.

7. A system comprising the decoder of claim 1 and further comprising an analog front end that communicates with said decoder.

8. A network device comprising the decoder of claim 1.

9. The network device of claim 8 wherein said network device is compliant with 10GBASE-T.

10. A decoder for a multiple-input multiple-output (MIMO) communications channel, comprising:
    an initial estimate generator module that generates initial decisions for X channels based on filtered outputs of received signals and feedback from prior decisions, wherein X is an integer greater than one;
    a constellation point selector module that selects P constellation points for each of said X channels from a constellation including N points based on said initial decisions, wherein N is an integer greater than two and P is an integer less than N and greater than one; and
    a maximum likelihood selector module that evaluates a maximum likelihood for each of $P^X$ permutations, which each include one of said selected P constellation points for each of said X channels, as feedback signals and that selects one of said $P^X$ permutations as a final decision.

11. The decoder of claim 10 wherein said initial estimate generator module generates said initial decisions based on:

$\tilde{X}_0 = (1-\alpha B_0)^{-1}\alpha(W^*Y + B_p\hat{X}_p)$, where $\alpha$ is a scaling factor to achieve an unbiased decision estimate, $B_0$ is a feedback matrix, Y is said received signals, W* is a feedforward matrix, $B_p$ is a feedback matrix, and $\hat{X}_p$ are said prior decisions.

12. The decoder of claim 11 wherein $B_0 = \epsilon_0 - R_{11}\mathrm{diag}(R_{11})^{-1}$, where $\epsilon_0$ is a matrix with a first block that is an identity matrix and remaining blocks are zero and wherein $R_{11}$ is the first X by X submatrix of $R = I - H_c^*(H_cH_c^* - HH^* - \sigma^2/E_x I)^{-1}H_c$.

13. The decoder of claim 10 wherein said constellation point selector module, for each of said X channels, selects said P constellation points that are closest to said initial decisions.

14. The decoder of claim 10 wherein said maximum likelihood selector module selects said one of said $P^X$ permutations based on mean squared error (MSE) calculations.

15. The decoder of claim 14 wherein an MSE value is determined for each of said $P^X$ permutations and one of said $P^X$ permutations corresponding to a minimum one of said MSE values is selected.

16. A system comprising the decoder of claim 10 and further comprising an analog front end that communicates with said decoder.

17. A network device comprising the decoder of claim 10.

18. The network device of claim 17 wherein said network device is compliant with 10GBASE-T.

19. A decoder for a multiple-input multiple-output (MIMO) communications channel, comprising:
  an initial estimate generator module that generates initial decisions for X channels based on:
  $$\tilde{X}_0=(1-\alpha B_0)^{-1}\alpha(W^*Y+B_p\tilde{X}_p),$$
  where $\alpha$ is a scaling factor to achieve an unbiased decision estimate, $B_0$ is a feedback matrix, Y is a received signal, $W^*$ is a feedforward matrix, $B_p$ is a feedback matrix, $\tilde{X}_p$ are prior decisions, and X is an integer greater than one; and
  a constellation point selector module that selects P constellation points for each of said X channels from a constellation including N points based on said initial decisions, wherein N is an integer greater than two and P is an integer less than N and greater than one.

20. The decoder of claim 19 further comprising a maximum likelihood selector module that evaluates a maximum likelihood for each of $P^X$ permutations, each permutation including one of said selected P constellation points for each of said X channels, as feedback signals and that selects one of said $P^X$ permutations as a final channel decision.

21. The decoder of claim 19 wherein $B_0=\epsilon_0-R_{11}\mathrm{diag}(R_{11})^{-1}$ where $\epsilon_0$ is a matrix with a first block that is an identity matrix and remaining blocks are zero and wherein $R_{11}$ is the first X by X submatrix of $R=I-H_c^*(H_cH_c^*-HH^*-\sigma^2/E_x I)^{-1}H_c$.

22. The decoder of claim 19 wherein said constellation point selector module, for each of said X channels, selects said P constellation points that are closest to a corresponding one of said initial decisions.

23. The decoder of claim 20 wherein said maximum likelihood selector module selects said one of said $P^X$ permutations based on mean squared error (MSE) calculations.

24. The decoder of claim 23 wherein an MSE value is determined for each of said $P^X$ permutations and one of said $P^X$ permutations corresponding to a minimum one of said MSE values is selected.

25. A system comprising the decoder of claim 19 and further comprising an analog front end that communicates with said decoder.

26. A network device comprising the decoder of claim 19.

27. The network device of claim 26 wherein said network device is compliant with 10GBASE-T.

28. A communications device that communicates with a remote communications device including X channels, each including a transmitter and a receiver, wherein X is an integer greater than one, comprising:
  X receivers;
  a decoder associated with said X receivers that includes:
    an initial estimate generator module that generates initial decisions for said X receivers based on filtered outputs of received signals and feedback from prior decisions;
    a constellation point selector module that selects P constellation points for each of said X receivers from a constellation including N points based on said initial decisions, wherein said P constellation points are closest to said initial decisions, wherein N is an integer greater than two and P is an integer less than N and greater than one; and
    a current estimate selector module that evaluates $P^X$ permutations, each permutation including one of said selected P constellation points for each of said X receivers, as feedback signals and that generates final decisions based on a selected one of said $P^X$ permutations.

29. The communications device of claim 28 wherein said initial estimate generator module generates said initial decisions based on:
  $$\tilde{X}_0=(1-\alpha B_0)^{-1}\alpha(W^*Y+B_p\hat{X}_p),$$
  where $\alpha$ is a scaling factor to achieve an unbiased decision estimate, $B_0$ is a feedback matrix, Y is said received signals, $W^*$ is a feedforward matrix, $B_p$ is a feedback matrix, and $\hat{X}_p$ are said prior decisions.

30. The communications device of claim 29 wherein $B_0=\epsilon_0-R_{11}\mathrm{diag}(R_{11})^{-1}$ where $\epsilon_0$ is a matrix with a first block that is an identity matrix and remaining blocks are zero and wherein $R_{11}$ is the first X by X submatrix of $R=I-H_c^*(H_cH_c^*-HH^*-\sigma^2/E_x I)^{-1}H_c$.

31. The communications device of claim 28 wherein said current estimate selector module selects said one of said $P^X$ permutations based on mean squared error (MSE) calculations.

32. The communications device of claim 31
  wherein an MSE value is determined for each of said $P^X$ permutations and one of said $P^X$ permutations corresponding to a minimum one of said MSE values is selected.

33. A system comprising the communications device of claim 28 and further comprising an analog front end that communicates with said decoder.

34. A network device comprising the communications device of claim 28.

35. The network device of claim 34 wherein said network device is compliant with 10GBASE-T.

36. A partial maximum likelihood (ML) far end crosstalk (FEXT) decoder for a multiple-input multiple-output (MIMO) communications channel, comprising:
  initial estimate generating means for generating initial decisions for X channels based on filtered outputs of received signals and feedback from prior decisions, wherein X is an integer greater than one;
  constellation point selecting means for selecting P constellation points for each of said X channels from a constellation including N points based on said initial decisions, wherein N is an integer greater than two and P is an integer less than N and greater than one; and
  current estimate selecting means for evaluating $P^X$ permutations, each permutation including one of said selected P constellation points for each of said X channels, as feedback signals and for generating final decisions based on a selected one of said $P^X$ permutations.

37. The decoder of claim 36 wherein said initial estimate generating means generates said initial decisions based on:
  $$\tilde{X}_0=(1-\alpha B_0)^{-1}\alpha(W^*Y+B_p\hat{X}_p),$$
  where $\alpha$ is a scaling factor to achieve an unbiased decision estimate, $B_0$ is a feedback matrix, Y is said received signals, $W^*$ is a feedforward matrix, $B_p$ is a feedback matrix, and $\hat{X}_p$ are said prior decisions.

38. The decoder of claim 37 wherein $B_0=\epsilon_0-R_{11}\mathrm{diag}(R_{11})^{-1}$ where $\epsilon_0$ is a matrix with a first block that is an identity matrix and remaining blocks are zero and wherein $R_{11}$ is the first X by X submatrix of $R=I-H_c^*(H_cH_c^*-HH^*-\sigma^2/E_x I)^{-1}H_c$.

39. The decoder of claim 36 wherein said constellation point selecting means, for each of said X channels, selects said P constellation points that are closest to a corresponding one of said initial decisions.

40. The decoder of claim 36 wherein said current estimate selecting means selects said one of said $P^X$ permutations based on mean squared error (MSE) calculations.

41. The decoder of claim 40 wherein an MSE value is determined for each of said $P^X$ permutations and one of said $P^X$ permutations corresponding to a minimum one of said MSE values is selected.

42. A system comprising the decoder of claim 36 and further comprising front end means for processing a received signal and for communicating with said decoder.

43. A network device comprising the decoder of claim 36.

44. The network device of claim 43 wherein said network device is compliant with 10GBASE-T.

45. A partial maximum likelihood (ML) far end crosstalk (FEXT) decoder for a multiple-input multiple-output (MIMO) communications channel, comprising:
   initial estimate generating means for generating initial decisions for X channels based on filtered outputs of received signals and feedback from prior decisions, wherein X is an integer greater than one;
   constellation point selecting means for selecting P constellation points for each of said X channels from a constellation including N points based on said initial decisions, wherein N is an integer greater than two and P is an integer less than N and greater than one; and
   maximum likelihood selecting means for evaluating a maximum likelihood for each of $P^X$ permutations, which each include one of said selected P constellation points for each of said X channels, as feedback signals and for selecting one of said $P^X$ permutations as a final decision.

46. The decoder of claim 45 wherein said initial estimate generating means generates said initial decisions based on:

$$\tilde{X}_0 = (1-\alpha B_0)^{-1}\alpha(W^*Y + B_p \hat{X}_p),$$

where $\alpha$ is a scaling factor to achieve an unbiased decision estimate, $B_0$ is a feedback matrix, Y is said received signals, $W^*$ is a feedforward matrix, $B_p$ is a feedback matrix, and $\hat{X}_p$ are said prior decisions.

47. The decoder of claim 46 wherein $B_0 = \epsilon_0 - R_{11}\text{diag}(R_{11})^{-1}$ where $\epsilon_0$ is a matrix with a first block that is an identity matrix and remaining blocks are zero and wherein $R_{11}$ is the first X by X submatrix of $R = I - H_c^*(H_c H_c^* - HH^* - \sigma^2/E_x I)^{-1} H_c$.

48. The decoder of claim 45 wherein said constellation point selecting means, for each of said X channels, selects said P constellation points that are closest to said initial decisions.

49. The decoder of claim 45 wherein said maximum likelihood selecting means selects said one of said $P^X$ permutations based on mean squared error (MSE) calculations.

50. The decoder of claim 49 wherein an MSE value is determined for each of said $P^X$ permutations and one of said $P^X$ permutations corresponding to a minimum one of said MSE values is selected.

51. A system comprising the decoder of claim 45 and further comprising an analog front end means for processing a received signal and for communicating with said decoder.

52. A network device comprising the decoder of claim 45.

53. The network device of claim 52 wherein said network device is compliant with 10GBASE-T.

54. A decoder for a multiple-input multiple-output (MIMO) communications channel, comprising:
   initial estimate generating means for generating initial decisions for X channels based on:

$$\tilde{X}_0 = (1-\alpha B_0)^{-1}\alpha(W^*Y + B_p \hat{X}_p),$$

where $\alpha$ is a scaling factor to achieve an unbiased decision estimate, $B_0$ is a feedback matrix using current decisions, Y is a received signal, $W^*$ is a feedforward matrix, $B_p$ is a feedback matrix, $\hat{X}_p$ are prior decisions, and X is an integer greater than one; and
   constellation point selecting means for selecting P constellation points for each of said X channels from a constellation including N points based on said initial decisions, wherein N is an integer greater than two and P is an integer less than N and greater than one.

55. The decoder of claim 54 further comprising maximum likelihood selecting means for evaluating a maximum likelihood for each of $P^X$ permutations, each permutation including one of said selected P constellation points for each of said X channels as feedback signals and for selecting one of said $P^X$ permutations as a final channel decision.

56. The decoder of claim 54 wherein $B_0 = \epsilon_0 - R_{11}\text{diag}(R_{11})^{-1}$ where $\epsilon_0$ is a matrix with a first block that is an identity matrix and remaining blocks are zero and wherein $R_{11}$ is the first X by X submatrix of $R = I - H_c^*(H_c H_c^* - HH^* - \sigma^2/E_x I)^{-1} H_c$.

57. The decoder of claim 54 wherein said constellation point selecting means, for each of said X channels, selects said P constellation points that are closest to a corresponding one of said initial decisions.

58. The decoder of claim 55 wherein said maximum likelihood selecting means selects said one of said $P^X$ permutations based on mean squared error (MSE) calculations.

59. The decoder of claim 58 wherein an MSE value is determined for each of said $P^X$ permutations and one of said $P^X$ permutations corresponding to a minimum one of said MSE values is selected.

60. A system comprising the decoder of claim 54 and further comprising analog front end means for processing a received signal and for communicating with said decoder.

61. A network device comprising the decoder of claim 54.

62. The network device of claim 51 wherein said network device is compliant with 10GBASE-T.

63. A communications device that communicates with a remote communications device including X channels, each including a transmitter and a receiver, wherein X is an integer greater than one, comprising:
   X receiving means for receiving signals;
   decoding means for performing partial maximum likelihood (ML) far end crosstalk (FEXT) decoding associated with said X receiving means and that includes:
      initial estimate generating means for generating initial decisions for said X channels based on filtered outputs of received signals and feedback from prior decisions;
      constellation point selecting means for selecting P constellation points for each of said X channels from a constellation including N points based on said initial decisions, wherein said P constellation points are closest to said initial decisions, wherein N is an integer greater than two and P is an integer less than N and greater than one; and
      current estimate selecting means for evaluating $P^X$ permutations, each permutation including one of said selected P constellation points for each of said X receiving means, as feedback signals and for generating final decisions based on a selected one of said $P^X$ permutations.

64. The communications device of claim 63 wherein said initial estimate generating means generates said initial decisions based on:

$$\tilde{X}_0 = (1-\alpha B_0)^{-1}\alpha(W^*Y + B_p \hat{X}_p),$$

where α is a scaling factor to achieve an unbiased decision estimate, $B_0$ is a feedback matrix, Y is said received signals, W* is a feedforward matrix, $B_p$ is a feedback matrix, and $\hat{X}_p$ are said prior decisions.

65. The communications device of claim 64 wherein $B_0=\epsilon_0-R_{11}\text{diag}(R_{11})^{-1}$ where $\epsilon_0$ is a matrix with a first block that is an identity matrix and remaining blocks are zero and wherein $R_{11}$ is the first X by X submatrix of $R=I-H_c^*(H_cH_c^*-HH^*-\sigma^2/E_xI)^{-1}H_c$.

66. The communications device of claim 63 wherein said current estimate selecting means selects said one of said $P^X$ permutations based on mean squared error (MSE) calculations.

67. The communications device of claim 66 wherein an MSE value is determined for each of said $P^X$ permutations and one of said $P^X$ permutations corresponding to a minimum one of said MSE values is selected.

68. A system comprising the communications device of claim 63 and further comprising analog front end means for communicating with said decoding means.

69. A network device comprising the communications device of claim 63.

70. The network device of claim 69 wherein said network device is compliant with 10GBASE-T.

71. A method of operating a partial maximum likelihood (ML) far end crosstalk (FEXT) decoder for a multiple-input multiple-output (MIMO) communications channel, comprising:
generating initial decisions for X channels based on filtered outputs of received signals and feedback from prior decisions, wherein X is an integer greater than one;
selecting P constellation points for each of said X channels from a constellation including N points based on said initial decisions, wherein N is an integer greater than two and P is an integer less than N and greater than one;
evaluating $P^X$ permutations, each permutation including one of said selected P constellation points for each of said X channels, as feedback signals; and
generating final decisions based on a selected one of said $P^X$ permutations.

72. The method of claim 70 wherein said initial decisions are based on:

$$\tilde{X}_0=(1-\alpha B_0)^{-1}\alpha(W^*Y+B_p\tilde{X}_p),$$

where α is a scaling factor to achieve an unbiased decision estimate, $B_0$ is a feedback matrix, Y is said received signals, W* is a feedforward matrix, $B_p$ is a feedback matrix, and $\tilde{X}_p$ are said prior decisions.

73. The method of claim 72 wherein $B_0=\epsilon_0-R_{11}\text{diag}(R_{11})^{-1}$ where $\epsilon_0$ is a matrix with a first block that is an identity matrix and remaining blocks are zero and wherein $R_{11}$ is the first X by X submatrix of $R=I-H_c^*(H_cH_c^*-HH^*-\sigma^2/E_xI)^{-1}H_c$.

74. The method of claim 71 further comprising, for each of said X channels, selecting said P constellation points that are closest to said initial decisions.

75. The method of claim 71 further comprising selecting said one of said $P^X$ permutations based on mean squared error (MSE) calculations.

76. The method of claim 75 further comprising:
determining an MSE value for each of said $P^X$ permutations; and
selecting one of said $P^X$ permutations corresponding to a minimum one of said MSE values.

77. A method of operating a decoder for a multiple-input multiple-output (MIMO) communications channel, comprising:
generating initial decisions for X channels based on filtered outputs of received signals and feedback from prior decisions, wherein X is an integer greater than one;
selecting P constellation points for each of said X channels from a constellation including N points based on said initial decisions, wherein N is an integer greater than two and P is an integer less than N and greater than one;
evaluating a maximum likelihood for each of $P^X$ permutations, which each include one of said selected P constellation points for each of said X channels, as feedback signals; and
selecting one of said $P^X$ permutations as a final decision.

78. The method of claim 77 wherein said initial decisions are based on:

$$\tilde{X}_0=(1-\alpha B_0)^{-1}\alpha(W^*Y+B_p\hat{X}_p),$$

where α is a scaling factor to achieve an unbiased decision estimate, $B_0$ is a feedback matrix, Y is said received signals, W* is a feedforward matrix, $B_p$ is a feedback matrix, and $\hat{X}_p$ are said prior decisions.

79. The method of claim 78 wherein $B_0=\epsilon_0-R_{11}\text{diag}(R_{11})^{-1}$ where $\epsilon_0$ is a matrix with a first block that is an identity matrix and remaining blocks are zero and wherein $R_{11}$ is the first X by X submatrix of $R=I-H_c^*(H_cH_c^*-HH^*-\sigma^2/E_xI)^{-1}H_c$.

80. The method of claim 77 further comprising, for each of said X channels, selecting said P constellation points that are closest to said initial decisions.

81. The method of claim 77 further comprising selecting said one of said $P^X$ permutations based on mean squared error (MSE) calculations.

82. The method of claim 81 further comprising:
determining an MSE value for each of said $P^X$ permutations; and
selecting one of said $P^X$ permutations corresponding to a minimum one of said MSE values.

83. A method for operating a decoder for a multiple-input multiple-output (MIMO) communications channel, comprising:
generating initial decisions for X channels based on:

$$\tilde{X}_0=(1-\alpha\beta_0)^{-1}\alpha(W^*Y+B_p\hat{X}_p),$$

where α is a scaling factor to achieve an unbiased decision estimate, $B_0$ is a feedback matrix, Y is a received signal, W* is a feedforward matrix, $B_p$ is a feedback matrix, $\hat{X}_p$ are said prior decisions, and X is an integer greater than one; and
selecting P constellation points for each of said X channels from a constellation including N points based on said initial decisions, wherein N is an integer greater than two and P is an integer less than N and greater than one.

84. The method of claim 83 further comprising:
evaluating a maximum likelihood for each of $P^X$ permutations, each permutation including one of said selected P constellation points for each of said X channels, as feedback signals; and
selecting one of said $P^X$ permutations as a final channel decision.

85. The method of claim 83 wherein $B_0=\epsilon_0-R_{11}\text{diag}(R_{11})^{-1}$ where $\epsilon_0$ is a matrix with a first block that is an identity matrix and remaining blocks are zero and wherein $R_{11}$ is the first X by X submatrix of $R=I-H_c^*(H_cH_c^*-HH^*-\sigma^2/E_xI)^{-1}H_c$.

86. The method of claim 83 further comprising, for each of said X channels, selecting said P constellation points that are closest to a corresponding one of said initial decisions.

87. The method of claim 84 further comprising selecting said one of said $P^X$ permutations based on mean squared error (MSE) calculations.

88. The method of claim 87 further comprising:
determining an MSE value for each of said $P^X$ permutations; and
selecting one of said $P^X$ permutations corresponding to a minimum one of said MSE values.

* * * * *

UNITED STATES PATENT AND TRADEMARK OFFICE
CERTIFICATE OF CORRECTION

PATENT NO. : 7,542,528 B1  
APPLICATION NO. : 10/978128  
DATED : June 2, 2009  
INVENTOR(S) : Kok-Wui Cheong It is certified that error appears in the above-identified patent and that said Letters Patent is hereby corrected as shown below:

| | |
|---|---|
| Column 4, Line 50 | Delete "A" and insert -- $\Delta$ -- |
| Column 6, Line 30 | Delete "casual" and insert -- causal -- |
| Column 8, Line 40 | Delete second "~" and insert -- ^ -- above the second "X" |
| Column 8, Line 46 | Delete "$^-_1$" and insert -- $^{-1}$ -- |
| Column 8, Line 50 | Delete "$^-_1$" and insert -- $^{-1}$ -- |
| Column 9, Line 50 | Delete second "~" and insert -- ^ -- |
| Column 9, Line 10 | Delete " $\tilde{X}$ " and insert -- $\hat{X}$ -- |
| Column 9, Line 26 | Delete "$^-_1$" and insert -- $^{-1}$ -- |
| Column 10, Line 63 | Delete "$^-_1$" and insert -- $^{-1}$ -- |
| Column 11, Line 44 | Delete "$^-_1$" and insert -- $^{-1}$ -- |
| Column 12, Line 21 | Delete "$^-_1$" and insert -- $^{-1}$ -- |
| Column 13, Line 45 | Delete "~" and insert -- ^ -- |
| Column 13, Line 49 | Delete "~" and insert -- ^ -- |
| Column 13, Line 55 | Delete "$^-_1$" and insert -- $^{-1}$ -- |

Signed and Sealed this

First Day of September, 2009

David J. Kappos  
*Director of the United States Patent and Trademark Office*